US011645284B2

United States Patent
Neugebauer et al.

(10) Patent No.: US 11,645,284 B2
(45) Date of Patent: May 9, 2023

(54) DISTRIBUTED JOIN FILTERS IN A DYNAMIC DISTRIBUTED DATA PROCESSING SERVICE

(71) Applicant: INTERNATIONAL BUSINESS MACHINES CORPORATION, Armonk, NY (US)

(72) Inventors: Bob Neugebauer, Stouffville (CA); David Vyvyan, Southampton (GB); Harmanraj Singh Wadhwa, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 638 days.

(21) Appl. No.: 16/819,909

(22) Filed: Mar. 16, 2020

(65) Prior Publication Data

US 2021/0286812 A1 Sep. 16, 2021

(51) Int. Cl.
*G06F 16/2455* (2019.01)
*G06F 16/9035* (2019.01)

(52) U.S. Cl.
CPC ...... *G06F 16/2456* (2019.01); *G06F 16/9035* (2019.01)

(58) Field of Classification Search
CPC .......................... G06F 16/2456; G06F 16/9035
USPC ........................................................ 707/714
See application file for complete search history.

(56) References Cited

U.S. PATENT DOCUMENTS

| | | | |
|---|---|---|---|
| 6,205,441 B1* | 3/2001 | Al-Omari | G06F 16/24537 707/999.005 |
| 9,760,604 B2 | 9/2017 | Billington et al. | |
| 10,198,475 B2 | 2/2019 | Mindnich et al. | |
| 10,275,493 B1 | 4/2019 | Mostak | |
| 10,528,599 B1* | 1/2020 | Pandis | G06F 16/2455 |
| 10,769,148 B1* | 9/2020 | Binkert | G06F 16/24542 |
| 11,475,000 B2* | 10/2022 | Abrashkevich | G06F 16/2452 |
| 2009/0077036 A1 | 3/2009 | Bent et al. | |
| 2012/0317093 A1* | 12/2012 | Teletia | G06F 16/2456 707/E17.032 |
| 2016/0217182 A1 | 7/2016 | Mindnich et al. | |
| 2017/0185647 A1 | 6/2017 | Billington et al. | |

(Continued)

OTHER PUBLICATIONS

March, Salvatore T., et al., "Allocating Data and Operations to Nodes in Distributed Database Design", IEEE Transactions on Knowledge and Data Engineering, vol. 7, No. 2, Apr. 1995, pp. 305-317.*

(Continued)

*Primary Examiner* — Robert Stevens
(74) *Attorney, Agent, or Firm* — Rakesh Roy; Andrew D. Wright; Calderon Safran & Cole P.C.

(57) ABSTRACT

A method includes: a first node and a second node in a distributed computing system each creating a respective partial join filter; the first node and the second node each transmitting its respective partial join filter to a third node in the distributed computing system; the third node creating a final join filter by combining the respective partial join filters of the first node and the second node; the third node retrieving target data from a data source of the third node by applying the final join filter to the data source of the third node; and the third node transmitting the retrieved target data to a controlling node in the distributed computing system.

20 Claims, 6 Drawing Sheets

(56) References Cited

U.S. PATENT DOCUMENTS

2019/0163775 A1    5/2019  Abrashkevich et al.
2019/0163783 A1    5/2019  Abrashkevich et al.
2019/0179723 A1    6/2019  Allin et al.

OTHER PUBLICATIONS

Golshanara, Ladan, et al., "A multi-colony ant algorithm for optimizing join queries in distributed database systems", Knowl. Inf. Syst., vol. 39, Apr. 2014, pp. 175-206.*
Jeon, Young-Ho, et al., "Distributed Join Processing Between Streaming and Stored Big Data Under the Micro-Batch Model", IEEE Access, vol. 7, Apr. 1, 2019, pp. 34583-34598.*
Shanoda, Mina Samir, et al., "JOMR: Multi-join Optimizer Technique to Enhance Map-Reduce Job", INFOS 2014, Cairo, Egypt, Dec. 15-17, 2014, pp. PDC-80-PDC-87.*
Mell et al., "The NIST Definition of Cloud Computing", NIST, Special Publication 800-145, Sep. 2011, 7 pages.
Bent, "A Dynamic Distributed Federated Database", https://www.researchgate.net/publication/262674503_A_Dynamic_Distributed_Federated_Database, Sep. 2008, 9 pages.
Anonymous, "Join Filters", https://docs.microsoft.com/en-us/sql/relational-databases/replication/merge/join-filters?view=sql-server-ver15, SQL Server | Microsoft Docs, Mar. 7, 2017, 3 pages.
Anonymous, "Join (SQL)", https://en.wikipedia.org/wiki/Join, Wikipedia, accessed Feb. 25, 2020, 15 pages.

\* cited by examiner

DISTRIBUTED JOIN FILTERS IN A DYNAMIC DISTRIBUTED DATA PROCESSING SERVICE

BACKGROUND

Aspects of the present invention relate generally to distributed and dynamic computing systems and, more particularly, to distributed join filters in a dynamic distributed data processing service utilizing multiple independent data sources A distributed and dynamic computing system (DDCS) refers to a computing environment having a large number of geographically dispersed and inter-connected computing nodes. The nodes are able to establish connections with one or more other nodes in a highly dynamic manner without a predetermined topology. In this regard, a DDCS is also characterized as being ad-hoc. Examples of topologies that may be used within a DDCS include fully connected, hierarchical, ring, and non-uniform partially connected graph. Further, a given DDCS may be subdivided into portions, where each different portion is implemented using one of the example topologies such that the DDCS, when taken as a whole, includes multiple, different topologies.

An example of a DDCS is a distributed database. A distributed database is configured for efficient query-response type operation. An even more particular example of a DDCS is a federated database, such as a dynamic distributed federated database (DDFD). A federated database is made up of a number of interconnected database management systems (DBMSs), each of which manages one or more databases. The federated database allows a single query to access the databases through the interconnected DBMSs. The query is received by the federated database and propagated over connections between the various DBMSs. DBMSs that control databases targeted by the query then translate the query into actions that are compatible with the databases they control.

Computer databases are structured collections of data which are managed to meet the needs of a community of users. A computer database relies on software, e.g., a DBMS, to manage the access and organization of the data. An organization may depend on a variety of computer databases which may not be natively compatible. For example, the various computer databases within an organization may use different operating systems, query languages, protocols, data structures or provide different functional capabilities. To unify the various computer databases within an organization, a federated database can be formed. The federated database is a system in which the various DBMSs act as gateways through which the databases can be accessed using a single query. The DBMSs are interconnected to allow messages to be passed through the federated database. They also act as interpreters which translate the various queries into actions that are compatible with the databases they control.

SUMMARY

In a first aspect of the invention, there is a computer-implemented method including: a first node and a second node in a distributed computing system each creating a respective partial join filter; the first node and the second node each transmitting its respective partial join filter to a third node in the distributed computing system; the third node creating a final join filter by combining the respective partial join filters of the first node and the second node; the third node retrieving target data from a data source of the third node by applying the final join filter to the data source of the third node; and the third node transmitting the retrieved target data to a controlling node in the distributed computing system.

In another aspect of the invention, there is a dynamic distributed federated database, comprising a plurality of nodes each implemented as a federated Relational Database Management System (RDBMS) engine, wherein: each node of a first subset of the plurality of nodes is configured to create a respective partial join filter in response to a query; each node of a second subset of the plurality of nodes is configured to create a respective final join filter by combining each of the respective partial join filters; each node of the second subset of the plurality of nodes is configured to retrieve target data from its respective data source by applying its respective final join filter to its respective data source; and each node of the second subset of the plurality of nodes is configured to transmit its respective retrieved target data to a controlling node.

In another aspect of the invention, there is a computer program product including one or more computer readable storage media having program instructions collectively stored on the one or more computer readable storage media. The program instructions are executable to: create a partial join filter in response to a query; create a final join filter by combining plural different partial join filters; retrieve target data from data source by applying the final join filter to the data source; and transmit the retrieved target data to a controlling node.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
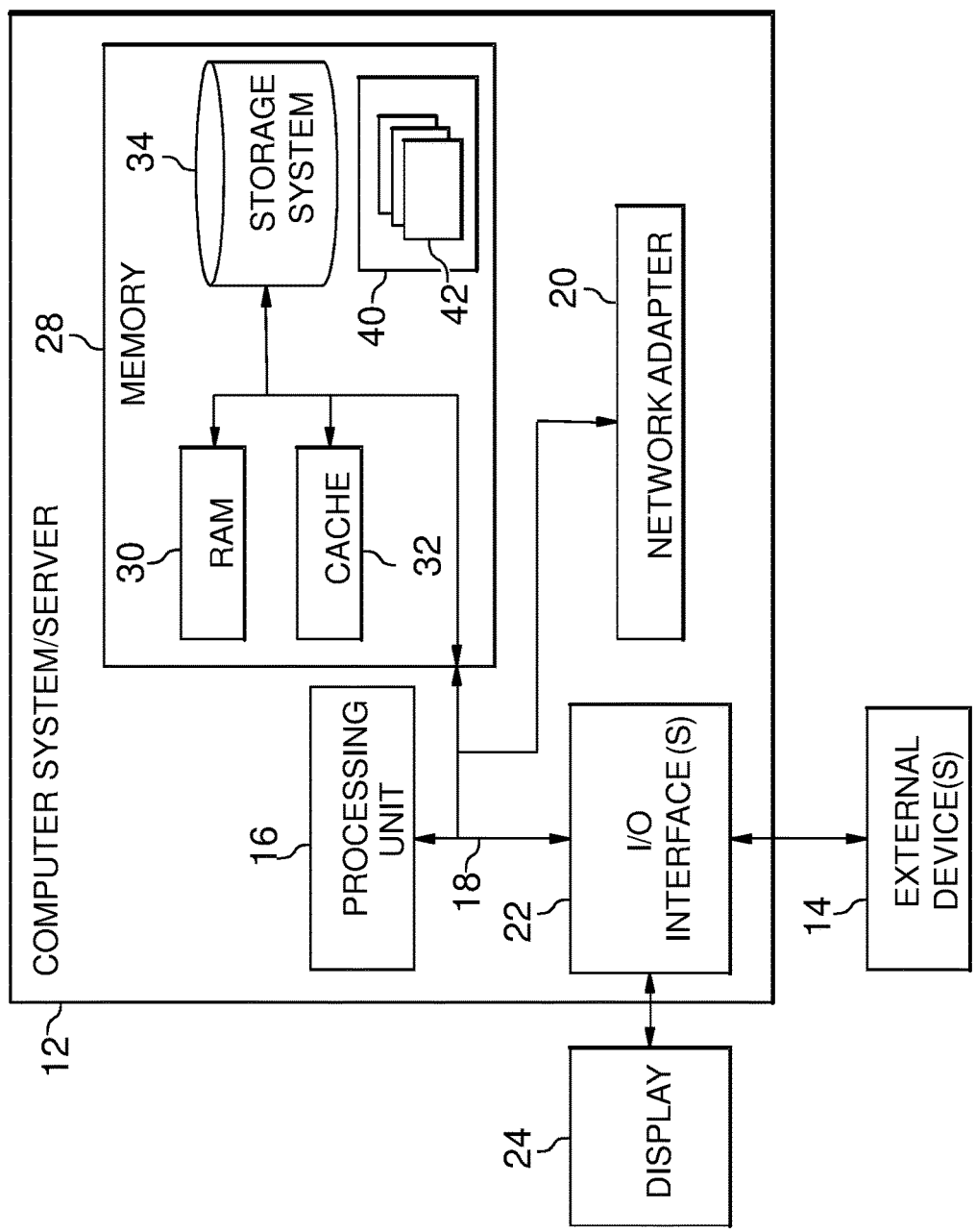
FIG. 1 depicts a cloud computing node according to an embodiment of the present invention.

In data processing systems, join processing is a fundamental element of processing that provides for meaningful use of the data. The number of connected devices is expanding rapidly, and in this environment there are many devices that contain data and are interconnected in a highly dynamic manner. In some scenarios, devices may disconnect and reconnect either on the same or different networks, in other scenarios network connections may be relatively stable.

One such configuration for these scenarios is a dynamic distributed federated database (DDFD). In such a dynamic network of interconnected nodes, each of which contains data and encompasses some computational capability, one missing capability is that of efficiently performing join operations over the plurality of such nodes.

Cases exist where a query involving join operations can be executed individually on a given node and such operation does not require data from other nodes. This capability provides a limited subset of join operations which can be performed over a network of nodes and is equivalent with standard database processing. More general join operations can be performed whereby data from each of the nodes is transferred to a central data processing system for general join processing. The data transfer will typically result in large data flows and poor performance since there is no early filtering of the data. Neither processing pattern enables general join operations to be performed efficiently on a dynamic network of interconnected nodes.

Additionally, specific cases exist with shallow hierarchies and tightly coupled interconnections between systems where distributed join processing can be performed efficiently. One technique for improving the performance of join operations is the use of join filters. This is particularly relevant in distributed systems due to the limitations or performance degradation outlined above. A join filter is based upon the predicates of the join condition as specified in the query language wherein the eligible values from the data relation of one operand of the join are used to pre-filter the rows of the data relation for one or more other operations of the join. Join filter processing can typically be considered to operate in two stages: the generation of the filter from one operand of the join, and the application of the filter with additional operands. In other implementations there exists a tight coupling between these stages and also requires synchronized processing between the distributed systems forming the data processing system.

Existing implementations typically require that the join operand, which is the source of the filter, exists upon a single node or is defined with a known partitioning that is compatible with the join condition or that it is repartitioned such that all values for given key reside upon the same node.

Aspects of the present invention relate generally to distributed and dynamic computing systems and, more particularly, to distributed join filters in a dynamic distributed data processing service utilizing multiple independent data sources. In particular, aspects of the present invention relate to a method of generating, distributing, and applying join filters in a loosely coupled dynamic network of arbitrary depth. This enables early filtering for join operations and reduced data flows without required synchronized operations between distributed data sources.

A join may consist of multiple data relations joined together by conditions specified in the query. For the purpose of illustration, one of those data relations is designated as the source of the filter and other data relations are designated as the target of filter. In practice there may be multiple different relations designated as a source or as a target or as both a source and target.

Each of the data relations may have portions of the data located within multiple independent data sources. In a dynamic data processing system as described, there is not necessarily a defined partitioning or distribution of data between those data sources. This implies that duplicate join key values may exist in multiple independent sources and that the building and application of a join filter must account for this unique situation compared to known techniques.

According to aspects of the invention, each data source containing data for the source of the join filter is instrumented to build a partial join filter during the local access of the referenced data relation. In embodiments, this partial join filter only represents the join condition for the particular data source upon which it is built and is not synchronized with the partial join filters from other data sources which contained a portion of the source data relation.

In accordance with aspects of the invention, each node that builds such a partial join filter then initiates a process by which that partial join filter is localized to all data sources containing a portion of the target data relation. In embodiments, the process does not require prior information about which data sources are targets, the distribution or partitioning of the data on or amongst the target sources.

In implementations, each of the plurality of data sources containing a portion of the target data relation, having asynchronously received respective partial join filters from the set of data sources with a portion of the source data relation, then process the complete set of partial join filters to generate a final join filter which is translated and applied to the target data relation. In embodiments, each instance of a data source containing the target data relation is independently responsible for building the final join filter to be applied to its own data. Such a decoupled architecture advantageously resolves many of the limitations that exist with other implementation for join filters.

Aspects of the invention improve the functioning of a computer system and technology by increasing the efficiency of the system. In particular, aspects of the invention improve the efficiency of a dynamic distributed processing service (such as a dynamic distributed federated database (DDFD)) by enabling early filtering for join operations and reduced data flows without required synchronized operations between distributed data sources. The use of partial join filters, in accordance with aspects of the invention, causes a data result set for a target data relation to be reduced in size, which leads to a reduction in data flow through the dynamic distributed processing service. Since data flow within a system has a cost in terms of system resources (e.g., CPU usage, memory usage, I/O operations, etc., that are used in performing the data flow), reducing the amount of data flow within the system while achieving a same result (e.g., providing a result to a query) has a concrete and tangible improvement on the efficiency of the system. This improvement in the functioning of a computer system and technology is a practical application. Aspects of the invention are also rooted in computer technology including distributed and dynamic computing systems and database management systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
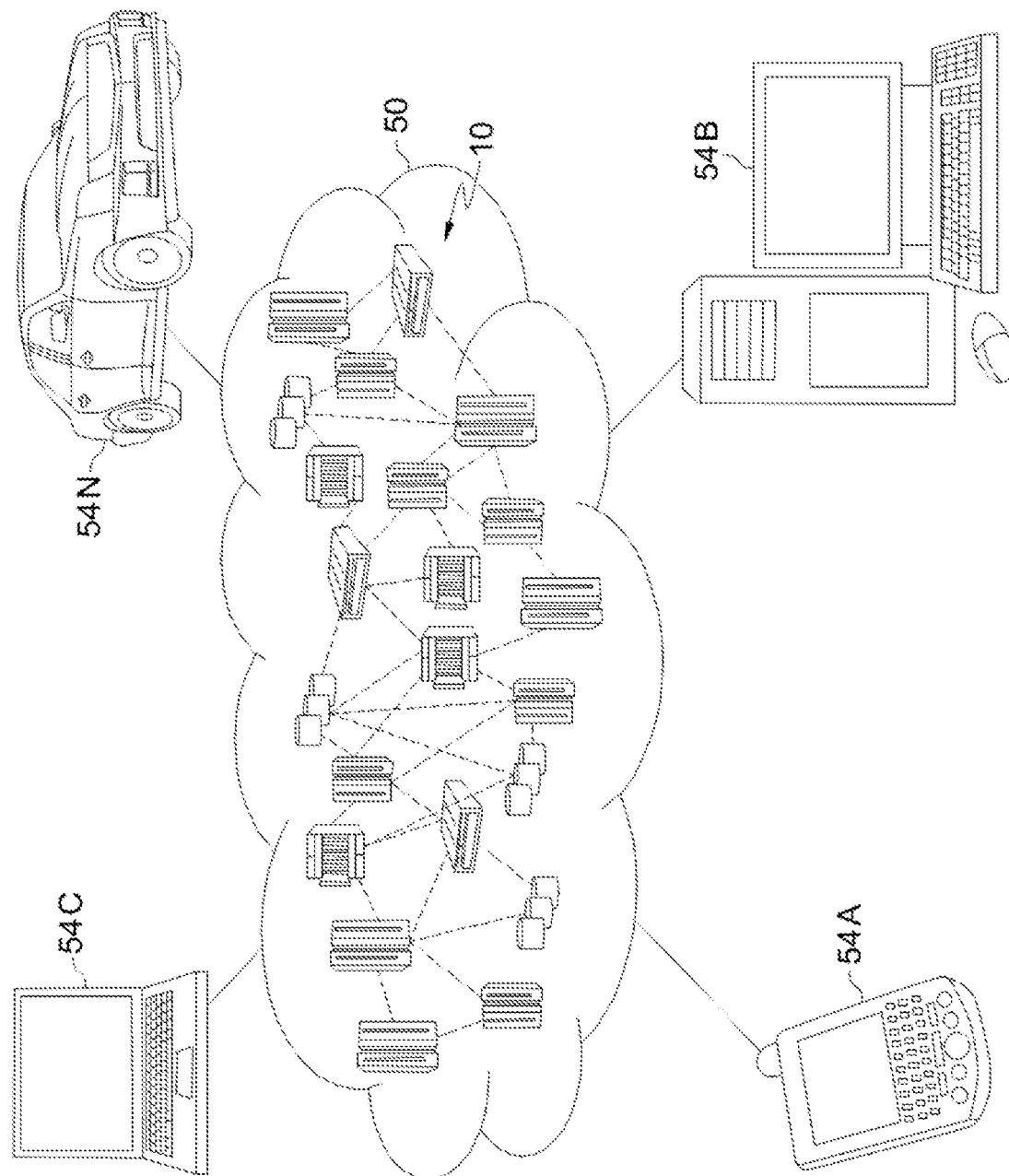
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
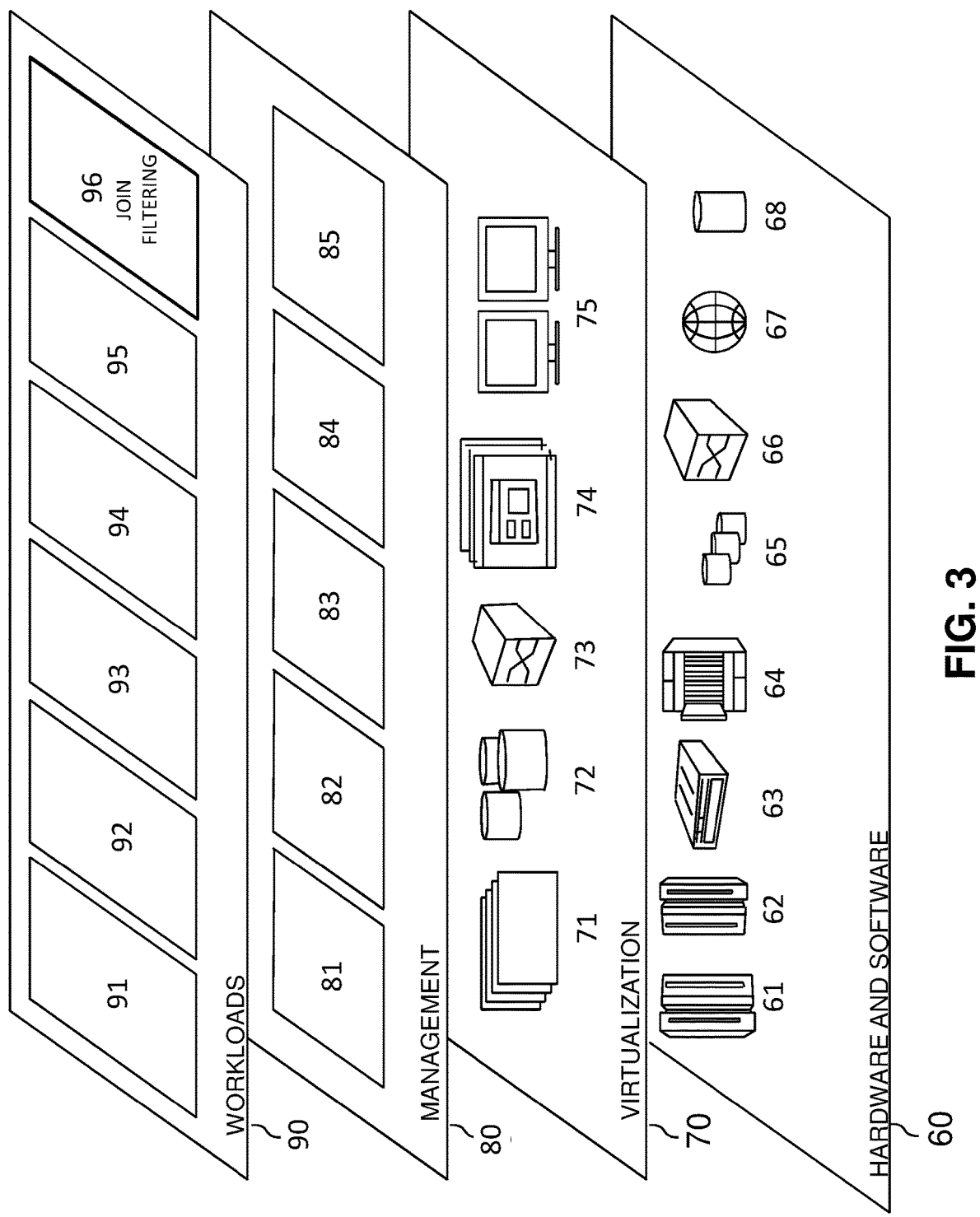
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and join filtering 96.

In an exemplary embodiment described herein, the join filtering is performed in the workloads layer 90. However, the join filtering described herein may be implemented in one or more other layers including hardware and software layer 60, virtualization layer 70, and management layer 80. Implementations of the invention may include a computer system/server 12 of FIG. 1 in which one or more of the program modules 42 are configured to perform (or cause the computer system/server 12 to perform) one of more functions of the join filtering 96 of FIG. 3. For example, the one or more of the program modules 42 may be configured to: create a partial join filter in response to a query; create a final join filter by combining plural different partial join filters; retrieve target data from data source by applying the final join filter to the data source; and transmit the retrieved target data to a controlling node.

FIGS. 1-3 are provided for purposes of illustration and not limitation. In some examples, nodes of a DDCS are coupled together via servers (e.g., cloud servers). In other examples, data sources of a DDCS are implemented external to the cloud. Similarly, nodes of the DDCS (e.g., federated database nodes) may be implemented close to the cloud, but not actually within or part of the cloud. In other cases, nodes of a DDCS may reside on premises of a user/customer.

Figure 4:
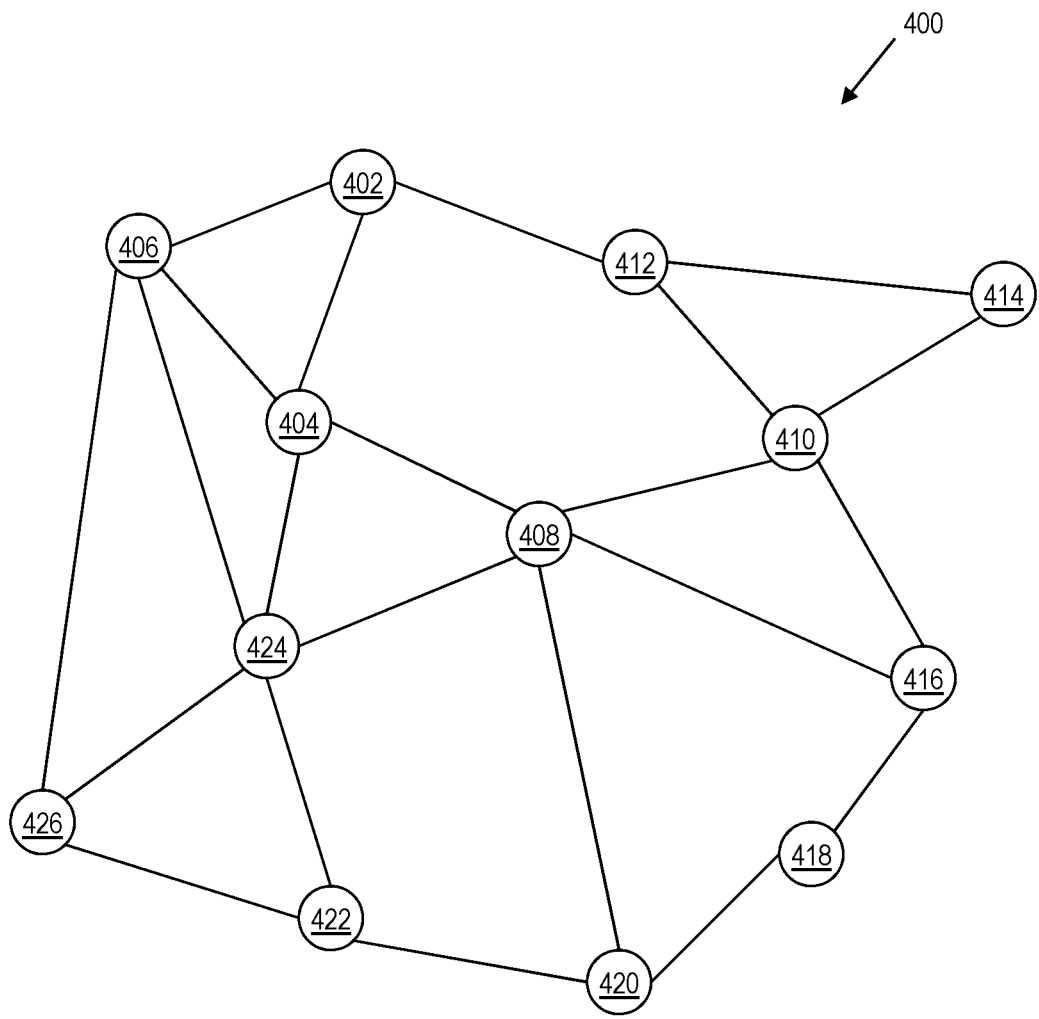
FIG. 4 shows a diagram of an exemplary environment in accordance with aspects of the invention.

FIG. 4 shows a diagram of an exemplary environment in accordance with aspects of the invention. In particular, FIG. 4 illustrates an example of a DDCS 400. In the example of FIG. 4, computing system 400 includes a plurality of nodes 402, 404, 406, 408, 410, 412, 414, 416, 418, 420, 422, 424, and 426. In the example of FIG. 4, a limited number of nodes are illustrated. It should be appreciated that a DDCS may include fewer nodes than shown or more nodes than shown. Further, the DDCS may be implemented using one or more or any combination of topologies. Example topologies include fully connected, hierarchical, ring, and non-uniform partially connected graph.

In the example of FIG. 4, nodes 402-426 are capable of establishing connections with one another in a dynamic manner. Selected ones of nodes 402-426 are capable of disconnecting from certain ones of nodes 402-426 and reconnecting to such nodes or other nodes on the same network. Other ones of nodes 402-426 are capable of disconnecting from certain ones of nodes 402-426 and reconnecting to such nodes or other nodes through a different network. Still other ones of nodes 402-426 are capable of maintaining relatively stable connections. Further, nodes 402-426 may be geographically distributed over large distances.

Each of nodes 402-426 may be implemented as a data processing system executing suitable operational software. For example, each of nodes 402-426 may be implemented using an architecture the same as, or similar to, the architecture described in connection with FIG. 1. Each of nodes 402-426 may execute join filtering 96 software or a variant of join filtering 96 software that is tailored to the particular functions of the node (e.g., as a node or as an actor). Additionally or alternatively, the join filtering described herein may be implemented in one or more of a software layer, virtualization layer, and management layer associated with the nodes 402-426. Other examples of nodes may include service nodes and endpoint nodes. As pictured, nodes 402-426 are interconnected.

In one or more embodiments, the DDCS 400 is implemented as a federated database. A federated database facilitates a "store-locally-query-anywhere" paradigm that includes a set of interconnected nodes as illustrated in the example of FIG. 4. The DDCS 400 may be implemented as an ad-hoc network of federated nodes. A federated database allows a single query to access the databases (e.g., all data sources) through the interconnected RDBMS engines. For purposes of illustration, node 402 may be an actor. A query received by or generated by an actor may be distributed throughout the federated database with results being provided back to the actor. The actor provides the results back to the original requesting node.

Other nodes within the federated database are coupled to, or include, one or more internal data sources. An example of an internal data source is an in-memory data-cache or an internal and/or embedded database. Other examples of internal data sources include, but are not limited to, log files, network connection and/or data source metadata, and sensor data. Each node may also be coupled to zero, one, or more external data sources. Examples of external data sources include one or more different RDBMSs or other data sources such as flat files of data records.

In particular embodiments, each node of a federated database may be implemented as a federated Relational Database Management System (RDBMS) engine. Each of the nodes is able to query across the internal data sources and external data sources as if the data sources were one logical database. For purposes of illustration, nodes 402-426 may be implemented as such nodes.

In the example of FIG. 4, the internal and external data sources coupled to the various nodes are not shown. To illustrate aspects of the invention, consider the following exemplary query received by the DDCS 400 of FIG. 4:

select t1.prod_name, t1.prod_desc, t1.avail_date,
t2.storeid, t2.quantity, t2.invoice_price
from small.product as T1
inner join
large.store_sales as T2
on T1.prodid=T2.prodid
where T1.avail_date between '2018-01-01'
and '2018-06-30'

In accordance with aspects of the invention, after the DDCS 400 receives the exemplary query, the DDCS 400 decides which referenced data relation (e.g., small.product vs large.store_sales in this example) shall be the source of the join filter and which shall be the target of the join filter. In embodiments, the DDCS 400 decides the source and the target using predetermined criteria with a referenced data relation. In one example, a controlling node of the DDCS 400 decides the source and the target based on statistics and the join method chosen for execution. For this exemplary query, the DDCS 400 decides small.product is the source of the join filter and large.store_sales is the target of the join filter In a general dynamic data processing service there can be multiple instances of both data relations (i.e., both source and target), and they can exist on independent nodes that may not have direct connections with each other. By way of illustration, consider a retail environment consisting of many locations. With reference to the exemplary query, each location of the retail environment has its own independent data source with a local version of the large.store_sales tables and the combined set of store_sales tables represents the global sales of the company. Each location may also have a local copy of the small.product table and the corporate office may also have a product table for other purposes such as online sales, returns, warranty, etc. In such a scenario, there is a relation over multiple independent sources with generally disjoint data sets joined with a separate relation over multiple independent sources, each of which may contain partially overlapping data. Moreover, as is common in a dynamic distributed network of independent data sources, each data source does not typically have direct connections with other data sources for the purpose of sharing information.

In accordance with aspects of the invention, having determined the source and target for the join filter, the controlling node of the DDCS 400 separately annotates remote access instructions with instructions about required processing for the join filter. In embodiments, the remote access instructions are then invoked with the DDCS 400 to be propagated to the various nodes containing the data (e.g., the source data relation and the target data relation). In embodiments, the remote access instructions include, for example and without limitation: identifying information about the source and/or target relations for a join filter; a description of the components of the source and/or target relations which shall have a join filter either created for or applied upon; a mapping between the components of the source and/or target relations; functional evaluation which may be applied to the components of the source and/or target relations; data types and any conversions required upon the components of the source and/or target relations; identifying information related to the join filter type and granularity of the join filter.

In implementations of the invention, nodes of the DDCS 400 that contain a portion of the source data relation, in response to receiving the remote access instructions, retrieve data from the data source according to the particular methods as determined by the data source. In this manner, each node that contains a portion of the source data relation retrieves eligible values from its data source according to the query. In the example query mentioned above, each node of the DDCS 400 that contains a small.product table retrieves data from its small.product table that satisfies the relevant conditions of the query (e.g., where T1.avail_date between '2018-01-01' and '2018-06-30'). In embodiments, each node that retrieves this data then transmits its retrieved data to the controlling node, concurrently the node also decides whether to build a partial join filter immediately or defer such a build to other nodes within the DDCS 400.

In embodiments, a particular node that contains a portion of the source data relation is configured to: retrieve data according to the query (e.g., as described above); and build (e.g., generate) a partial join filter according to its retrieved data. In embodiments, the partial join filter built by a particular node defines a subset of the data of that node that satisfies the query. For example, continuing the description of the exemplary query, each node of the DDCS 400 that contains a small.product table is configured to retrieve data from its small.product table that satisfies the conditions of the query and build a partial join filter based on its retrieved data, where the partial join filter defines a subset of a particular node's small.product table that satisfies the query. In implementations, the partial join filter defines the subset in any suitable manner, such as with one or more range based filters, one or more hash based filters, and/or one or more key-list based filters. In an example of a range based filter in the ongoing description of the exemplary query, a partial join filter for a node may comprise a data structure indicating that a specified range of rows the small.product table of this node satisfy the query. A variety of join filter implementations can be used, and aspects of the invention are not limited to any one particular type of join filter implementation when generating the partial join filters. However, partial join filters made by various nodes in the DDCS 400 should be capable of being combined into a single global filter that accounts for overlaps in the filter data between the nodes. Range based filters, hash based filters, and key-list based filters all meet this condition.

According to aspects of the invention, after a node of the DDCS 400 builds its partial join filter, that node then transmits its partial join filter to other nodes in the DDCS 400 that contain an instance of the target data relation. In embodiments, a node transmitting its partial join filter is not required to have a direct connection to any nodes containing components of the target data relation, and may not have any specific knowledge of the actual location of the target data relation components. There are a variety of options for a node containing an instance of the source data relation to initiate this transmission of its partial join filter which depend upon the information available. In one example, given sufficient information and connections within the DDCS 400, a node containing an instance of the source data relation can initiate direct transmission of its partial join filter to a node containing an instance of the target data relation(s) via the dynamic connections of the network. In another example, a node containing an instance of the source data relation can pass its partial join filter to an upstream node (of the node containing an instance of the source data relation) along the dynamic query path back to the controlling node in the service and allow the upstream node to initiate the transmission to the node containing an instance of the target data relation(s), in which case the upstream node is configured to make similar choices. In a third example, a node containing an instance of the source data relation can initiate transmission of its partial join filter to all nodes to which it has connections, in which case all nodes receiving the partial join filter are configured to make similar choices. In embodiments, at each level of the DDCS 400, the capability exists for a partial join filter to be combined with other filters.

In accordance with aspects of the invention, each node containing an instance of the target data relation (e.g., large.store_sales in the exemplary query) asynchronously receives a set of partial join filters from the node(s) containing an instance of the source data relation (e.g., small.product in the exemplary query). In embodiments, the nodes containing an instance of the target data relation receive the partial join filters prior to receiving the remote access instructions for accessing the target data relation (e.g., from the controlling node), or alternatively receive the partial join filters after receiving the remote access instructions for accessing the target data relation.

In embodiments, when a node containing an instance of the target data relation receives both the remote access instructions and a set of partial join filters, the node containing an instance of the target data relation combines the set of partial join filters to generate a final join filter and applies the global filter to its data source to retrieve target data for the query. In implementations, each node containing an instance of the target data relation independently generates the final join filter and applies the global filter to its data source (e.g., independently of any other nodes containing an instance of the target data relation). In this manner, each node that contains an instance of the target data relation retrieves target data from its data source according to the final join filter. Applying a join filter to a data source to retrieve filtered data from the data source is understood by those of skill in the art (e.g., a join filter is based upon the predicates of the join condition as specified in the query language wherein the eligible values from the data relation of one operand of the join are used to pre-filter the rows of the data relation for one or more other operations of the join). In this manner, with reference to the exemplary query, a node in the DDCS 400 containing a large.store_sales table receives respective partial join filters from plural nodes that each contain a small.product table, combines the respective partial join filters into a single final join filter, and retrieves target data from its large.store_sales table based on application of the final join filter to the large.store_sales table. The data result set for the target data relation, having been filtered early by the final join filter, is expected to be reduced in size leading to a reduction in data flow through the dynamic distributed processing service (e.g., the DDCS 400).

As described thus far, the nodes containing an instance of the source data relation 'push' the partial join filters to the nodes containing an instance of the target data relation. In another embodiment, instead of nodes containing an instance of the source data relation in the DDCS 400 initiating the transmission of the partial join filter, the nodes containing an instance of the target data relation 'pull' the partial join filters from the nodes containing an instance of the source data relation by initiating a request to receive the partial join filters. In this embodiment, one or more of the nodes containing an instance of the target data relation receives the remote access instructions from the controlling node and determines that a join filter is appropriate. The determination may be made based on any number of suitable factors including but not limited to: random sampling of data that satisfies the query (e.g., to determine whether the amount of data exceeds a threshold that indicates a filter should be used); and type of storage media (e.g., hard drive, solid state drive, tape, etc.) on which data that satisfies the query is stored (e.g., to determine whether a cost of retrieving the data exceeds a threshold that indicates a filter should be used). In this pull embodiment, after a node containing an instance of the target data relation determines that a filter is applicable and sends a request to nodes containing an instance of the source data relation to generate partial join filters, the node containing an instance of the target data relation then receives the partial join filters from the nodes containing an instance of the source data relation, combines the partial join filters into a final join filter, and uses the final join filter to retrieve target data in the same manner as described with respect to the push embodiment.

In another embodiment, any node containing an instance of the target data relation receives a first partial join filter from a node containing an instance of the source data relation, determines that the first partial join filter is not sufficient, requests the node or nodes containing an instance of the source data relation provide another partial join filter, and then receives a second partial join filter from the same node or nodes containing an instance of the source data relation. The second partial join filter is different than the first partial join filter. This embodiment accounts for the situation where any node containing an instance of the target data relation determines, after receiving a partial join filter from a node containing an instance of the source data relation, that the partial join filter received from the node containing an instance of the source data relation does not adequately filter the result of the node containing an instance of the target data relation. For example, the initial filter might be too coarse in that it filters too few results of the node containing an instance of the target data relation. In this case, the node containing an instance of the target data relation asks the node or nodes containing an instance of the source data relation to provide a less coarse filter that will filter more results of the node containing an instance of the target data relation, e.g., due to the local characteristics of the component of the target data relation. In this embodiment, after a node containing an instance of the target data relation receives a filter of sufficient granularity from the node or nodes containing an instance of the source data relation, the node containing an instance of the target data relation combines this filter with the partial join filters from other nodes containing an instance of the source data relation to create a final join filter, and uses the final join filter to retrieve target data in the same manner as described with respect to the push embodiment.

Aspects have been described thus far with only two data relations in a query. However, implementations are not limited to use with queries having only two data relations, and instead may be used with queries having three or more data relations. In various examples of handling a query having three or more data relations, implementations of the invention can operate to: have the third data relation use the partial join filters built by the first and/or second data relations; have the second data relation build an independent join filter after the application of join filter from the first operand; and third and fourth data relations have independent join filter processing; or various combinations.

As should be apparent from the description herein, implementations of the invention provide the ability to build partial join filters across multiple independent data sources and cause them to be propagated without highly synchronized communication between participating nodes. Implementations of the invention also provide the ability for nodes to receive data access instructions independently of the filter data and take appropriate action. Implementations of the invention also provide the ability for nodes to independently combine multiple partial join filters into a globally applicable filter. Implementations of the invention also provide the ability for nodes receiving data access instructions to request independent nodes to build and transmit filters.

Figure 5:
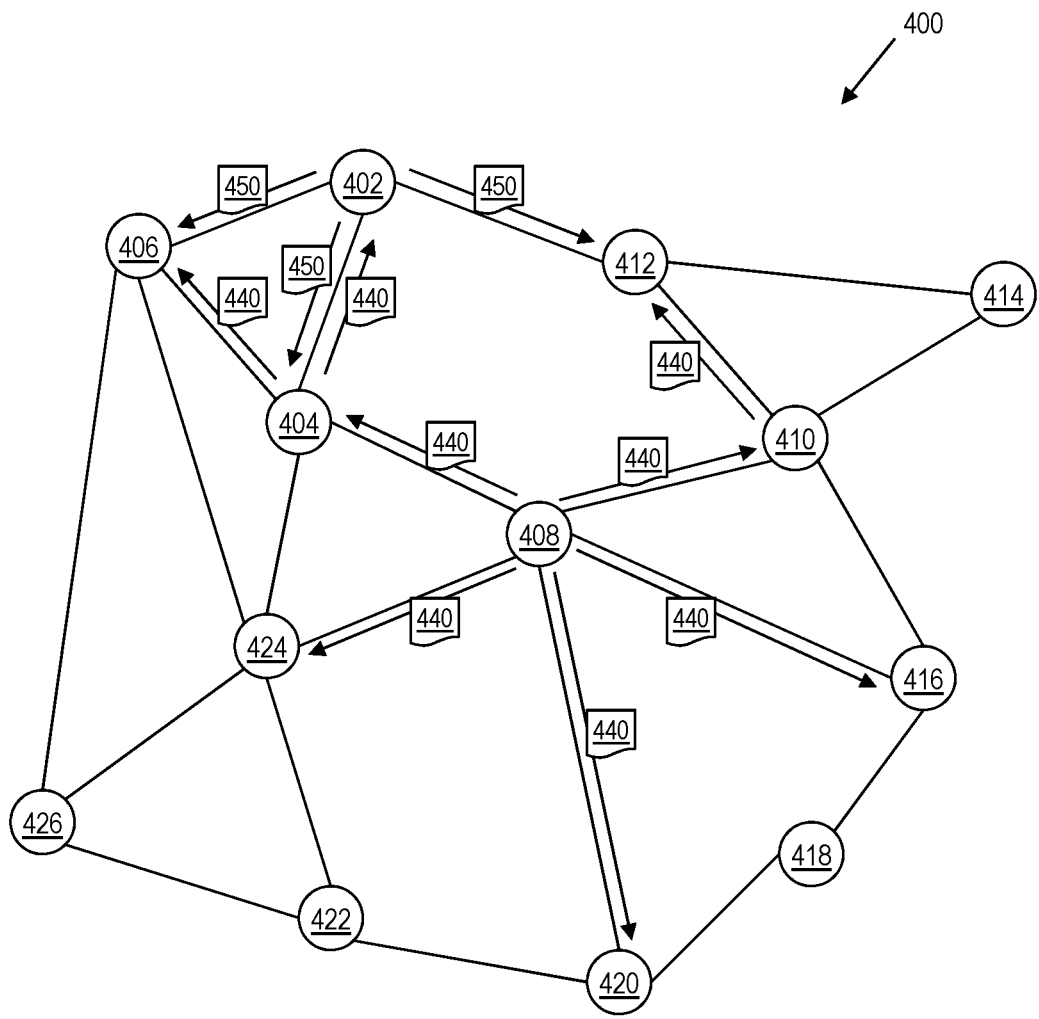
FIG. 5 illustrates an exemplary use case in accordance with aspects of the invention.

FIG. 5 illustrates an exemplary use case in accordance with aspects of the invention. Steps of the use case may be carried out in the environment of FIG. 4 and are described with reference to elements depicted in FIG. 4.

In the exemplary use case depicted in FIG. 5, the DDCS 400 receives the exemplary query:
select t1.prod_name, t1.prod_desc, t1.avail_date,
t2.storeid, t2.quantity, t2.invoice_price
from small.product as T1
inner join
large.store_sales as T2
on T1.prodid=T2.prodid
where T1.avail_date between '2018-01-01'
and '2018-06-30'

In embodiments, the DDCS 400 receives the query via network communication from a requesting computer device that is outside the DDCS 400. In one example, the query is an SQL query generated by a business application running on the requesting computer device that is internal or external to the DDCS 400, although implementations of the invention are not limited to SQL queries.

In accordance with aspects of the invention, a controlling node of the DDCS 400 analyzes the query and determines that "small.product" is the source data relation and "large.store_sales" is the target data relation. The controlling node is any node within the DDCS 400 that is programmed to receive a query from a requesting computer device, determine a source data relation and a target data relation of the query, annotate the remote access instructions defining the processing for a join filter containing the source data relation and the target data relation of the query, transmit the remote access instructions to nodes in the DDCS 400, receive data from nodes in the DDCS 400 based on the remote access instructions, generate a query result based on the data from nodes in the DDCS 400, and transmit the query result to the requesting computer device.

In the example shown in FIG. 5, the controlling node determines that nodes 402 and 408 contain instances of the source data relation for the join filter. That is, node 402 contains an instance of a small.product table, and node 408 contains another instance of a small.product table, the respective instances of the tables being local versions that differ from one another in the data contained therein.

In the example shown in FIG. 5, the controlling node determines that nodes 402, 404, 406, and 412 contain instances of the target data relation for the join filter. That is, node 402 contains an instance of a large.store_sales table, node 404 contains another instance of a large.store_sales table, node 406 contains another instance of a large.store_sales table, and node 412 contains another instance of a large.store_sales table, the respective instances of the tables being local versions that differ from one another in the data contained therein.

In the example shown in FIG. 5, the controlling node annotates the remote access instructions defining the processing for a join filter containing the source data relation and the target data relation of the query, and transmits the remote access instructions to nodes 402, 404, 406, 408, and 412 via the dynamic connections of the network. In embodiments, the controlling node sends instructions to nodes 402 and 408 that contain instances of the source data relation for the join filter, and independently sends different instructions to nodes 402, 404, 406, and 412 that contain instances of the target data relation for the join filter. The instructions sent to nodes 402 and 408 are remote access instructions for the source data relation, and the instructions sent to nodes 402, 404, 406, and 412 are remote access instructions for the target data relation.

With continued reference to the example shown in FIG. 5, node 408 (which contains an instance of the source data relation, i.e., contains a local instance of a small.product table) receives the remote access instructions from the controlling node. In response to receiving the remote access instructions, node 408 retrieves data from its data source that satisfies the query, transmits this data to the controlling node, and builds a partial join filter based on this data. For example, node 408 may determine that rows 15-39 of its small.product table satisfy the query. In this case, node 408 transmits the data specified in the query (t1.prod_name, t1.prod_desc, t1.avail_date) contained in rows 15-39 of its small.product table to the controlling node, and builds a partial join filter that indicates that rows 15-39 of its small.product table of node 408 satisfy the query.

In accordance with aspects of the invention, after building its partial join filter, node 408 transmits its partial join filter (represented by 440) to the nodes containing an instance of the target data relation, i.e., nodes 402, 404, 406, and 412 in this example. In one example of this transmission, node 408 transmits its partial filter 440 to all its peer nodes in the network, i.e., nodes 404, 410, 416, 420, and 424. In embodiments, node 408 is aware that nodes 402, 404, 406, and 412 contain instances of the target data relation (e.g., via the remote access instructions), and thus are the intended recipients of the partial join filter. However, in this example of a loosely coupled network, node 408 does not have a direct connection to all of nodes 402, 404, 406, and 412. As a result, in some embodiments, node 408 transmits its partial join filter 440 to all its peer nodes (i.e., nodes 404, 410, 416, 420, and 424) with instructions to the peer nodes to transmit the partial join filter to any of nodes 402, 404, 406, and 412. In this manner, node 408 transmits the partial join filter to node 410 which does not include an instance of the target data relation, and then node 410 forwards the partial join filter to node 412 which does include an instance of the target data relation. Also in this manner, node 408 transmits the partial join filter to node 404 which includes an instance of the target data relation, and then node 404 forwards the partial join filter to nodes 402 and 406 which includes an instance of the target data relation. Although not shown in FIG. 5, nodes 416, 420, and 424 that receive the partial join filter 440 from node 408 may also propagate the partial join filter to their respective peer nodes in the network, and those nodes may forward the partial join filter 440 to their peer nodes, etc., until the partial join filter 440 is propagated to all nodes in the network.

In another embodiment, a node that builds a partial join filter is aware of the connections between all nodes in the network, e.g., from available network data defining the network topology. In this embodiment, a node that builds a partial join filter determines a path to each node that includes an instance of the target data relation, and transmits the partial join filter only to nodes along that path. In this manner, the node that builds a partial join filter does not send the partial join filter to all its peer nodes, but instead sends the partial join filter to a predetermined subset of its peer nodes as dictated by the determined paths to the nodes that includes an instance of the target data relation. In this embodiment, in the example shown in FIG. 5, node 408 only sends its partial join filter 440 to node 410 (for forwarding to node 412) and to node 404 (for use by node 404 and for forwarding to nodes 402 and 406), and does not send its partial join filter to nodes 416, 420, and 424.

With continued reference to the example shown in FIG. 5, node 402 (which also contains an instance of the source data relation, i.e., contains an instance of a small.product table) receives the remote access instructions from the controlling node. In response to receiving the remote access instructions, node 402 retrieves data from its data source that satisfies the query, transmits this data to the controlling node, and builds a partial join filter based on this data. For example, node 402 may determine that rows 575-599 of its small.product table satisfy the query. In this case, node 402 transmits the data specified in the query (t1.prod_name, t1.prod_desc, t1.avail_date) contained in rows 575-599 of its small.product table to the controlling node, and builds a partial join filter that indicates that rows 575-599 of its small.product table of node 402 satisfy the query.

In accordance with aspects of the invention, after building its partial join filter, node 402 transmits its partial join filter (represented by 450) to the other nodes containing an instance of the target data relation, i.e., nodes 404, 406, and 412 in this example. Node 402 may transmit its partial join filter 450 using the full propagation method (e.g., by sending to all its per nodes), or by using the determined path method, both as previously described. In this example, node 402 transmits its partial join filter 450 to nodes 404, 406, and 412.

With continued reference to the example shown in FIG. 5, nodes 404, 406, and 412 each receive a copy of the partial join filter 440 and a copy of the partial join filter 450. Node 402 receives a copy of the partial join filter 440 and already has a copy of its own partial join filter 450. In this manner, each node that has an instance of the target data relation is provided with a set of all the partial join filters from the respective nodes that contain an instance of the source data relation. In embodiments, and as described herein, each node 402, 404, 406, and 412 then independently combines the respective partial join filters 440 and 450 to create a final join filter, applies this final join filter to its data of the target data relation to retrieve target data according to the filter, and transmits the retrieved target data to the controlling node. For example, node 402 creates a final join filter by combining the respective partial join filters 440 and 450, and uses this final join filter to filter data from the node 402 instance of the large.store_sales table. In this manner, node 402 retrieves target data (e.g., t2.storeid, t2.quantity, t2.invoice_price) from its instance of the large.store_sales table that is filtered by the final join filter that is made from partial join filters 440 and 450. Nodes 404, 406, and 412 each perform these combining, retrieving, and transmitting steps independently of each other.

Still referring to the example shown in FIG. 5, in the pull embodiment, nodes 402, 404, 406, and 412 initiate a request to receive a filter from each of nodes 402 and 408. In this embodiment, nodes 402 and 408 receive the request to create a partial join filter from one or more of nodes 402, 404, 406, and 412 via the dynamic connections of the network instead of from the controlling node. In response to receiving the request, nodes 402 and 408 create their respective partial join filters, and transmit the partial join filters to nodes 402, 404, 406, and 412. As previously described, a node may transmit its partial join filter to all its peer nodes (e.g., in a broadcast embodiment) or to a determined subset of its peer nodes (e.g., in a directed embodiment). Upon receiving the partial join filters, nodes 402, 404, 406, and 412 then independently combine the partial join filters into a final join filter, apply the final join filter to the target data relation, and transmit the filtered results to the controlling node.

Still referring to the example shown in FIG. 5, in the iterative embodiment, nodes 402 and 408 each receive remote access instructions to create a partial join filter from the controlling node. Nodes 402 and 408 create their respective partial join filters and transmits these filters to nodes 402, 404, 406, and 412. One or more of nodes 402, 404, 406, and 412 determines that at least one of the partial join filters is not of sufficient granularity, and transmits a request to the associated node (402 or 408) to provide a filter of a higher granularity. In embodiments, such a decision is based upon local factors at the data source and the ability of the node to estimate the effectiveness of the filter. For example, it could be done by comparing local distribution statistics for the large data relation in the data source against the filter, or by use of sampling queries executed upon the data source. In some instances, filter instructions originally provided by the controlling node to the source relation nodes are limited versus locally determined data distribution statistics at the target relation nodes because computation of statistics (used to resolve filter instructions) consumes a prohibitive amount of time and resources (across the whole network) for increasing levels of granularity. A further consequence of this is that the controlling node's statistics will typically be less current than locally determined ones (proportionally to the rate of source data updates federated by nodes across the network). As a result, in some exemplary implementations, the system uses local statistics to determine filter instructions, as this is more effective both in terms of granularity and currency.

In embodiments, the combining of the partial join filters together comprises combining the data indicated in the partial join filters into a single join filter that is applicable to the data source of the target data relation. The method of combining the partial join filters is dependent on the type of filters being used. In embodiments, for key-list based filters, the combining comprises combining the key-list of each partial join filter into a single join filter and removing any duplicate entries. For example, if node 402 generates a partial join filter indicating keys 1 through 10, and node 408 generates a partial join filter indicating keys 21 through 3000, then the final join filter is keys 1-10 and 21-3000. In embodiments, for single range filters, the combining comprises determining a range minimum and a range maximum of the range indicated in each partial join filter, and then defining a global range minimum and a global range maximum for the final join filter, where the global range minimum and a global range maximum define a range that encompasses all the ranges of the different partial join filters. In embodiments, for multi range filters in which each partial join filter defines plural ranges, the combining comprises combining all the individual ranges in a manner that maximizes the gaps between ranges while concurrently minimizing the number of ranges.

In embodiments, after creating a final join filter, a node having an instance of the target data relation translates the filter to a form that the node can apply to its particular instance of the target data relation. In one example, the node translates a definition of ranges in the final join filter to a format that is applicable to ranges of the target data relation. Translating a join filter to a format that is applicable to a local instance of a table is understood by those having ordinary skill in the art of federated database systems, such that further explanation is not necessary.

As described herein, the DDCS 400 may comprise a network that is a connected series of nodes. The particular organization of the DDCS 400 is not limiting. Some common patterns include fully connected, hierarchical, ring, and non-uniform partially connected graph. Combinations of topologies are also possible, for example with hierarchical at the top with each leaf of the hierarchical portion being a non-uniform partially connected graph. A partially connected graph can be described as set of non-uniform connections between nodes. Some nodes may have fewer number of connections and some may have larger numbers of connections. Some of the connections may be bidirectional and some may be unidirectional. The DDCs 400 is an example of a partially connected set of nodes, in which not all nodes are fully connected.

The use and distribution of a join filter as described herein results in significant reductions in data movement since data is filtered in the data source prior to being transmitted. Query responsiveness is also improved in the non-uniform partially connected graph model because the distribution of the filter does need to wait for the data to be received by a coordinating node in order to build the filter. In a hub and spoke model or hierarchical model, data from a node having an instance of the source target relation would be received at the hub in order to construct the filter to distribute to other nodes. This may take significant time in data transmission. In the non-uniform partially connected graph, as with DDCS 400, construction and distribution of the filter can take place locally at the node as soon as the data is read prior to network transmission delays.

In embodiments using the non-uniform partially connected graph, as with DDCS 400, the controlling node may know the full topology of the network. Knowing the full topology can result in more optimal network processing since it can utilize shortest path algorithms. In some implementations the controlling node does know which nodes are part of the DDCS 400, but not the actual network links between each node. In embodiments, each node is capable of making local decisions about propagation based on the local knowledge of peers that it is connected to. In practice this causes a higher incidence of small control messages to build information about paths but lower requirement for full coordination. Lower requirement for full coordination allows the structure of the network to change more freely given local network conditions. One application where lower coordination is advantageous is in mobile communications such as mobile phones and automobiles where the network access points are constantly changing.

In some implementations in which a range based filter is used, the partial join filter is a series of pairs representing the data ranges. The node creating the partial join filter varies the granularity of the filter by the number of ranges. Aspects are not limited to range based filters, however, and a hash based filter or bloom filter can also be used with similar aspects for varying the granularity. The only condition on the filter type is that it can be combined with other partial join filters when received by a node having an instance of the target data relation.

Despite the example query using only a single join predicate, implementations can support multiple join predicates between the small and large data relations. Each join predicate represents a relationship between the source data relation and the target data relation using the particular component or expression referenced by the predicate. In some implementations, for each such component or expression, an independent partial join filter may be created and distributed to nodes containing an instance of the target data relation. In other implementations, each component or expression may be combined into a single join filter that is distributed to nodes containing an instance of the target data relation. Each component may use a different filter mechanism as described earlier.

Figure 6:
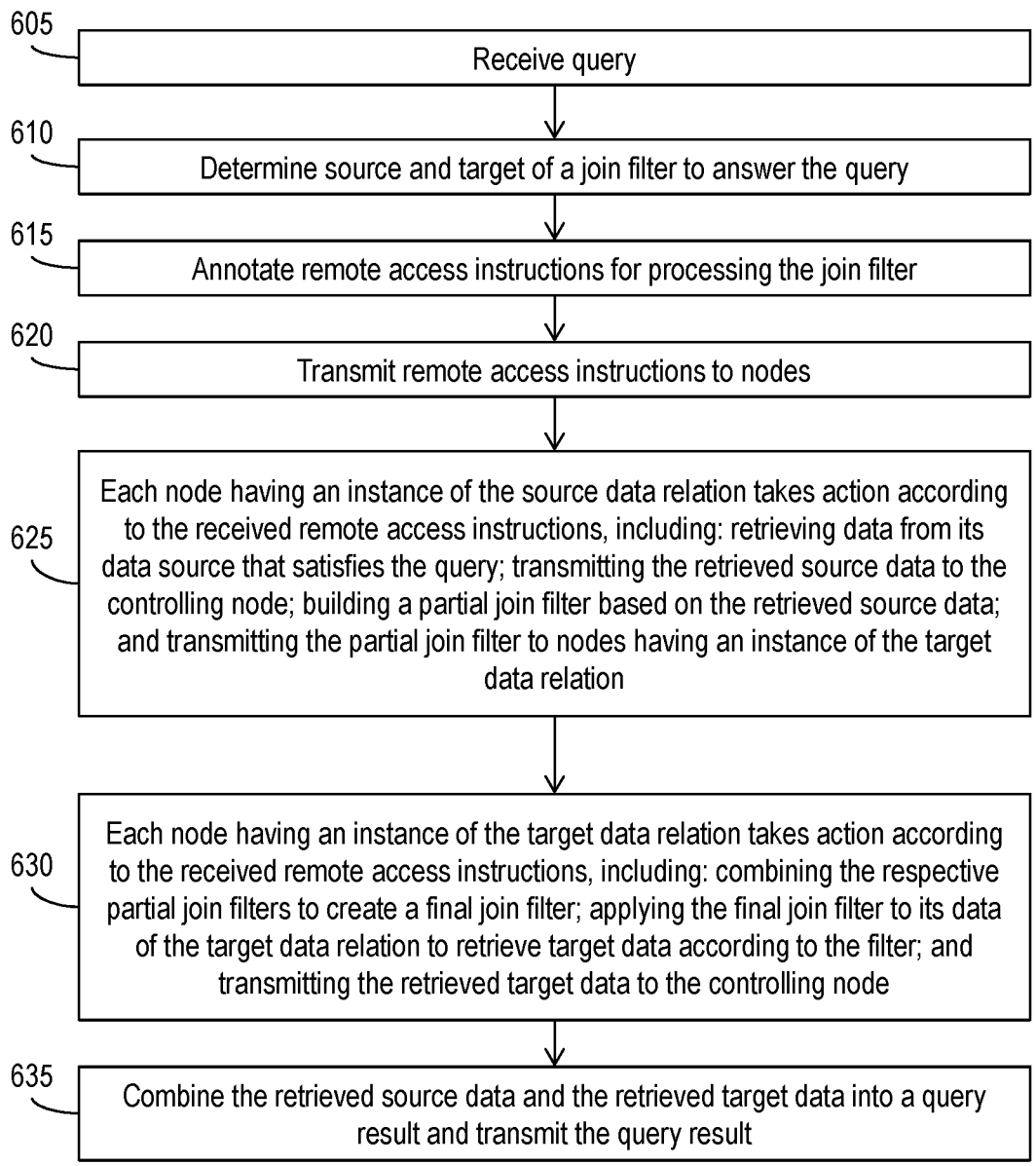
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and in accordance with the example of FIG. 5, and are described with reference to elements depicted in FIGS. 4 and 5.

At step 605, the system receives a query. In embodiments, and as described with respect to FIGS. 4 and 5, the DDCS 400 receives a query (e.g., such as an SQL query) from a business application of a requesting computer device.

At step 610, the system determines a source and a target of a join filter to answer the query. In embodiments, and as described with respect to FIGS. 4 and 5, a controlling node of the DDCS 400 determines the source data relation and a target data relation of a join filter. In embodiments, and as described with respect to FIGS. 4 and 5, the controlling node determines which nodes in the DDCS 400 contain an instance of the source data relation and which nodes in the DDCS contain an instance of the target data relation.

At step 615, the system annotates remote access instructions for processing the join filter. In embodiments, and as described with respect to FIGS. 4 and 5, the controlling node of the DDCS 400 annotates remote access instructions for the nodes that contain an instance of the source data relation, and also annotates remote access instructions for the nodes that contain an instance of the target data relation.

At step 620, the system transmits the remote access instructions to the nodes. In embodiments, and as described with respect to FIGS. 4 and 5, the controlling node of the DDCS 400 transmits the annotated remote access instructions to the nodes that contain an instance of the source data relation and the nodes that contain an instance of the target data relation.

At step 625, each node having an instance of the source data relation takes action according to the received remote access instructions. In embodiments, and as described with respect to FIGS. 4 and 5, each node having an instance of the source data relation retrieves data from its data source that satisfies the query, transmits the retrieved source data to the controlling node, builds a partial join filter based on the retrieved source data, and transmits the partial join filter to nodes having an instance of the target data relation. In embodiments, the partial join filter created by a respective node only represents the join condition for the particular data source upon which it is built and is not synchronized with the partial join filters from other data sources which contain a portion of the source data relation. In one embodiment, and as described with respect to FIG. 5, each node having an instance of the source data relation transmits its partial join filter to all of its peer nodes. In another embodiment, and as described with respect to FIG. 5, each node having an instance of the source data relation determines (or is provided with data defining) a path to each intended recipient, and transmits its partial join filter only to those nodes along the path.

At step 630, each node having an instance of the target data relation takes action according to the received remote access instructions. In embodiments, and as described with respect to FIGS. 4 and 5, each node having an instance of the target data relation combines the respective partial join filters to create a final join filter, applies the final join filter to its data of the target data relation to retrieve target data according to the filter, and transmits the retrieved target data to the controlling node.

At step 635, the system combines the retrieved source data and the retrieved target data into a query result and transmits the query result. In embodiments, and as described with respect to FIGS. 4 and 5, the controlling node combines the retrieved source data (received at step 625) and the retrieved target data (received at step 630) into a query result and transmits the query result to the requesting computer device (from step 605).

The method shown in FIG. 6 corresponds to the push embodiment in which the controlling node instructs the nodes having the instances of the source data relation to create the partial join filters. In implementations, the method may be adjusted to utilize the pull embodiment, in which the a node having the target data relation sends a request to each node having an instance of the source data relation to create the partial join filters. In implementations, the method may be adjusted to utilize the iterative embodiment, in which the one or more of nodes having an instance of the target data relation determines that at least one of the partial join filters is not of sufficient granularity, and transmits a request to the associated node to provide a filter of a higher granularity.

As should be understood from the description herein, aspects of the invention provide for a method comprising: at least a first node (e.g., node 402) and a second node (e.g., node 408) in a distributed computing system (e.g., DDCS 400) each creating a respective partial join filter (e.g., 450 and 440); the first node and the second node each transmitting its respective partial join filter to a third node (e.g., node 404) in the distributed computing system; the third node creating a final join filter by combining the respective partial join filters of the first node and the second node; the third node retrieving target data from a data source of the third node by applying the final join filter to the data source of the third node; and the third node transmitting the retrieved target data to a controlling node in the distributed computing system. In such a method, there may be more than two nodes that each create a respective partial join filter. In such a method, there may be plural nodes (e.g., nodes 402, 404, 406, 412) that receive the partial join filters, create a final join filter, and apply the final join filter to their data source.

As should be understood from the description herein, aspects of the invention provide for a computer-implemented process for generating distributed join filters in a dynamic distributed data processing service, the computer-implemented process comprising: in response to receiving a query, determining using predetermined criteria with a referenced data relation, a source of a join filter and a target of the join filter utilizing multiple independent data sources existing on a set of independent nodes in a network (e.g., by the controlling node); annotating remote access operations with instructions for processing the join filter when invoked with a dynamic distributed data processing service to be propagated to nodes containing data in the set of independent nodes (e.g., by the controlling node); in response to receiving the remote access instructions, retrieving, by each node containing a portion of a source data relation, data from the source according to a particular method determined by the data source (e.g., by a node having a source of the join filter); in response to receiving the data by a controlling node of the dynamic distributed data processing service, determining one of to build a partial join filter immediately and defer to build a partial join filter to other nodes within the dynamic data processing service (e.g., by a node having a source of the join filter); in response to building the partial join filter for a component of the source data relation, each node transmitting the partial join filter via the network to nodes containing a portion of a target data relation; in response to receiving the remote access instructions and a set of partial join filters by a particular node containing the portion of the target data relation, combining received partial join filters into a global filter prior to applying the global filter, by the particular node, to the source independently for each node containing a component of the target data relation (e.g., by a node having a target of the join filter); and generating a result set for the target data relation filtered earlier by all partial join filters (e.g., by a node having a target of the join filter).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
a first node and a second node in a distributed computing system each creating a respective partial join filter;
the first node and the second node each transmitting its respective partial join filter to a third node in the distributed computing system;
the third node creating a final join filter by combining the respective partial join filters of the first node and the second node;
the third node retrieving target data from a data source of the third node by applying the final join filter to the data source of the third node; and
the third node transmitting the retrieved target data to a controlling node in the distributed computing system.

2. The method of claim 1, wherein:
the first node comprises a first data source that includes a first instance of a source data relation; and
the second node comprises a second data source that includes a second instance of the source data relation.

3. The method of claim 2, wherein the data source of the third node includes an instance of a target data relation joined on the source data relation by a query.

4. The method of claim 3, wherein the controlling node receives the query and determines the source data relation and the target data relation.

5. The method of claim 4, wherein the first node and the second node each create their respective partial join filters in response to instructions received from the controlling node.

6. The method of claim 4, wherein:
the first node creates an initial partial join filter and transmits the initial partial join filter to the third node;
in response to receiving the initial first partial join filter, the third node transmits a request to the first node for a revised partial join filter; and
the respective partial join filter created by the first node and transmitted to the third node is the revised partial join filter.

7. The method of claim 3, wherein the first node and the second node each create their respective partial join filters in response to a request received from the third node.

8. The method of claim 3, wherein:
the first node retrieves first source data from the first data source according to the query and transmits the first source data to the controlling node; and
the second node retrieves second source data from the second data source according to the query and transmits the second source data to the controlling node.

9. The method of claim 8, wherein:
the first node creates its respective partial join filter based on the first source data without synchronized operations between the first data source and the second data source; and
the second node creates its respective partial join filter based on the second source data without synchronized operations between the first data source and the second data source.

10. The method of claim 8, wherein the controlling node creates a response to the query based on the first source data, the second source data, and the target data.

11. The method of claim 1, wherein the distributed computing system is a loosely coupled network.

12. The method of claim 11, wherein:
the first node transmits its respective partial join filter to all of its peers in the loosely coupled network; and
the second node transmits its respective partial join filter to all of its peers in the loosely coupled network.

13. The method of claim 11, wherein:
the first node transmits its respective partial join filter only to one or more peers along a first path to the third node in the loosely coupled network; and
the second node transmits its respective partial join filter only to one or more peers along a second path to the third node in the loosely coupled network.

14. The method of claim 1, wherein:

the distributed computing system comprises a fourth node that includes another instance of the target data relation;

the first node and the second node each transmits its respective partial join filter to the fourth node;

the fourth node creates another instance of a final join filter by combining the respective partial join filters of the first node and the second node;

the fourth node retrieves other target data from a data source of the fourth node by applying the other instance of the final join filter to the data source of the fourth node;

the fourth node transmits the other retrieved target data to the controlling node; and the fourth node creates the another instance of the final join filter, retrieves the other target data, and transmits the other retrieved target data independently of the actions performed by the third node.

15. A dynamic distributed federated database, comprising:

a plurality of nodes each implemented as a federated Relational Database Management System (RDBMS) engine, wherein:

each node of a first subset of the plurality of nodes is configured to create a respective partial join filter in response to a query;

each node of a second subset of the plurality of nodes is configured to create a respective final join filter by combining each of the respective partial join filters;

each node of the second subset of the plurality of nodes is configured to retrieve target data from its respective data source by applying its respective final join filter to its respective data source; and each node of the second subset of the plurality of nodes is configured to transmit its respective retrieved target data to a controlling node.

16. The dynamic distributed federated database of claim 15, wherein the plurality of nodes are arranged in a loosely coupled network.

17. The dynamic distributed federated database of claim 15, wherein each node of the second subset of the plurality of nodes is configured to create its respective final join filter independently of every other node of the second subset of the plurality of nodes.

18. The dynamic distributed federated database of claim 15, wherein each node of the first subset of the plurality of nodes is configured to create its respective partial join filter independently of every other node of the first subset of the plurality of nodes.

19. A computer program product comprising one or more computer readable storage media having program instructions collectively stored on the one or more computer readable storage media, the program instructions executable to:

create a partial join filter in response to a query;

create a final join filter by combining plural different partial join filters;

retrieve target data from data source by applying the final join filter to the data source; and transmit the retrieved target data to a controlling node.

20. The computer program product of claim 19, wherein the plural different partial join filters include the partial join filter created in response to the query.

* * * * *